(12) United States Patent
Kreuder et al.

(10) Patent No.: US 9,273,161 B2
(45) Date of Patent: *Mar. 1, 2016

(54) COMMON SOLVENT PROCESS FOR PRODUCING HIGH MOLECULAR WEIGHT HALOGENATED RUBBER

(75) Inventors: Carsten Kreuder, Sarnia (CA); Adam Gronowski, Sarnia (CA); John Lovegrove, Sarnia (CA); Hanns-Ingolf Paul, Leverkusen (DE); Rolf Feller, Mettmann (DE); Udo Wiesner, Bornheim (DE)

(73) Assignee: LANXESS INTERNATIONAL SA, Granges-Paccot (CH)

(*) Notice: Subject to any disclaimer, the term of this patent is extended or adjusted under 35 U.S.C. 154(b) by 515 days.

This patent is subject to a terminal disclaimer.

(21) Appl. No.: 13/522,762

(22) PCT Filed: Jan. 17, 2011

(86) PCT No.: PCT/EP2011/050530
§ 371 (c)(1),
(2), (4) Date: Jan. 17, 2013

(87) PCT Pub. No.: WO2011/089092
PCT Pub. Date: Jul. 28, 2011

(65) Prior Publication Data
US 2013/0137832 A1    May 30, 2013

(30) Foreign Application Priority Data
Jan. 20, 2010    (EP) .................................... 10000524

(51) Int. Cl.
C08F 8/22    (2006.01)
B60C 1/00    (2006.01)

(52) U.S. Cl.
CPC ..... *C08F 8/22* (2013.01); *B60C 1/00* (2013.01)

(58) Field of Classification Search
CPC .......................................................... C08F 8/22
USPC ...................................................... 525/332.8
See application file for complete search history.

(56) References Cited

U.S. PATENT DOCUMENTS

| 2,964,489 A | 12/1960 | Baldwin |
| 2,969,331 A | 1/1961 | Brynko et al. |
| 3,257,349 A | 6/1966 | Johnson |

(Continued)

FOREIGN PATENT DOCUMENTS

| CA | 1019095 | 10/1977 |
| EP | 0053585 | 11/1981 |

OTHER PUBLICATIONS

International Search Report from International Application PCT/EP2011/050530 (EP10000524) dated Feb. 7, 2011, 3 pages.

(Continued)

*Primary Examiner* — Bijan Ahvazi
*Assistant Examiner* — Lanee Reuther

(57) ABSTRACT

The invention relates to an energy efficient, environmentally favorable process for the preparation of halogenated rubbers, in particular chloro- and bromobutyl rubber, that uses a common aliphatic medium of specific composition for both solution polymerization and subsequent halogenation of the rubber. More particularly, the invention relates to a process that employs a common aliphatic medium for both solution polymerization and halogenation of rubber with intermediate removal of un-reacted monomers.

14 Claims, 1 Drawing Sheet

(56) References Cited

U.S. PATENT DOCUMENTS

| | | | |
|---|---|---|---|
| 3,361,725 A * | 1/1968 | Parker et al. | 526/185 |
| 3,932,371 A | 1/1976 | Powers | |
| 5,182,333 A | 1/1993 | Powers | |
| 5,681,901 A | 10/1997 | Newman | |
| 2008/0207815 A1 * | 8/2008 | Resendes et al. | 524/445 |
| 2011/0257342 A1 | 10/2011 | Paul | |

OTHER PUBLICATIONS

Morton, Butyl and Halobutyl Rubbers, Rubber Technology, Third Edition, Van Nostrand Reihnold Company Inc., 1987, pp. 297-300.

* cited by examiner

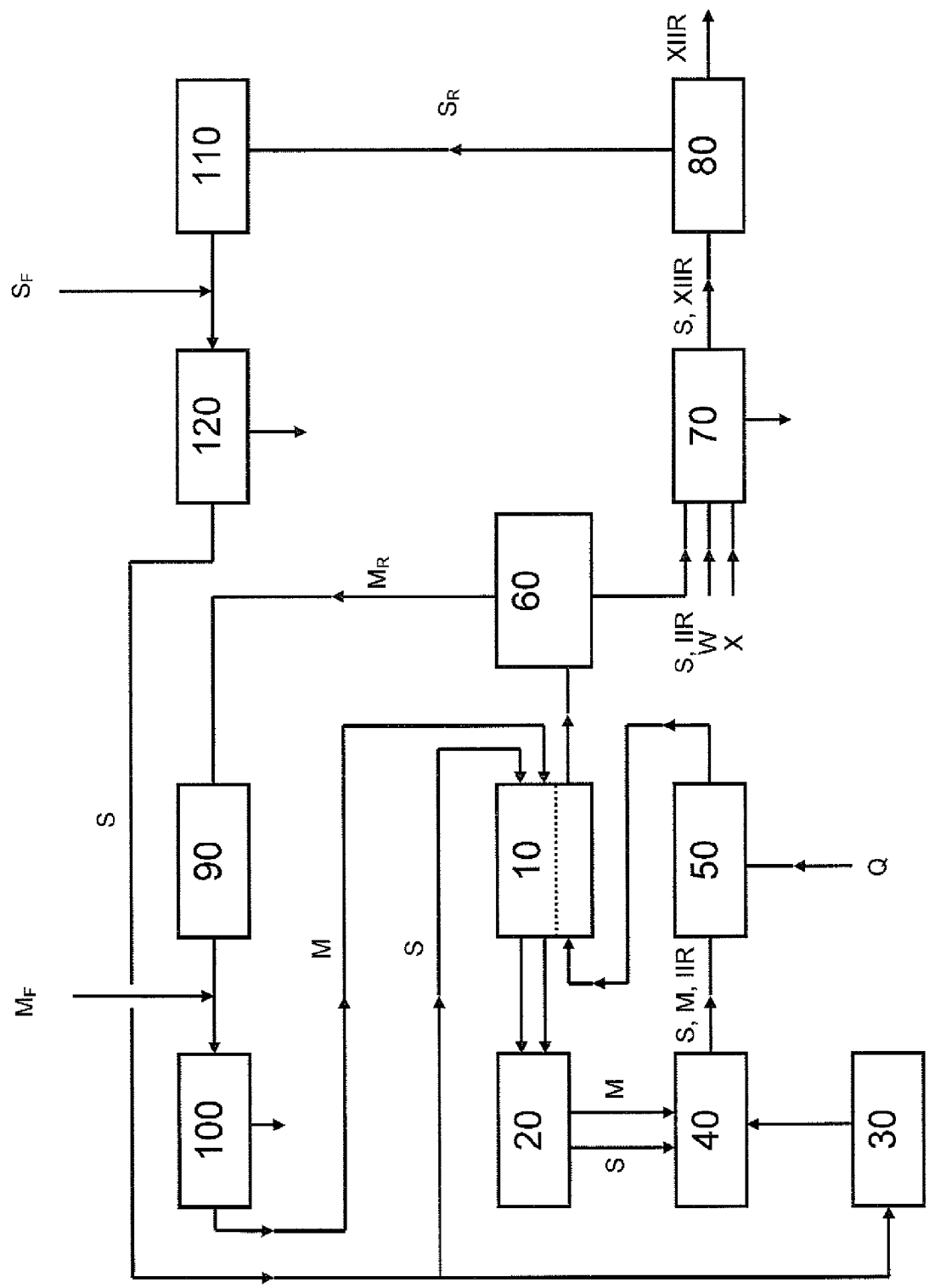

COMMON SOLVENT PROCESS FOR PRODUCING HIGH MOLECULAR WEIGHT HALOGENATED RUBBER

FIELD OF THE INVENTION

The invention relates to an energy efficient, environmentally favourable process for the preparation of halogenated rubbers, in particular chloro- and bromobutyl rubber, that uses a common aliphatic medium of specific composition for both solution polymerization and subsequent halogenation of the rubber. More particularly, the invention relates to a process that employs a common aliphatic medium for both solution polymerization and halogenation of rubber with intermediate removal of un-reacted monomers.

BACKGROUND

The term "butyl rubber" as used herein generally means and encompasses co-polymers of $C_4$ to $C_7$ isoolefins, $C_4$ to $C_{14}$ conjugated dienes and optionally other co-polymerizable monomers, if not defined otherwise. The term "halobutyl rubber" as used herein generally means and encompasses halogenated butyl rubbers, in particular chlorinated and brominated rubbers if not defined otherwise. An illustrative and preferred example of butyl rubber is a rubber obtained by co-polymerization of isoprene and isobutylene, which is hereinafter also referred to as IIR. Its brominated analogue is also referred to as BIIR, its chlorinated analogue is hereinafter also referred to as CIIR.

In the conventional process for producing halobutyl rubber (BIIR), isobutylene and isoprene monomers are first polymerized in a polar halohydrocarbon medium, such as methyl chloride with an aluminum based initiating system, typically either aluminum trichloride ($AlCl_3$) or ethyl aluminum dichloride ($EtAlCl_2$). The butyl rubber does not appreciably dissolve in this polar medium, but is present as suspended particles and so this process is normally referred to as a slurry process. Residual monomers and polymerization medium are then steam stripped from the butyl rubber, before it is dissolved in a halogenation medium, typically a non-polar medium such as hexane. The halogenation process ultimately produces the final halogenated product. The conventional process therefore employs separate polymerization and halogenation steps employing two different media. The use of a polar medium for polymerization and a non-polar medium for halogenation necessitates intermediate stripping and dissolving steps and is inefficient from an energy point of view.

The step of separating the monomers and methyl chloride from the butyl rubber is conducted before halogenation in order to avoid the formation of highly toxic by-products from the reaction of bromine with residual monomers. The normal boiling points of the components used in the process are: methyl chloride, –24° C.; isobutylene, –7° C.; and isoprene, 34° C. Any stripping process that removes the heavier of the residual monomers (isoprene) will also remove essentially all of the methyl chloride and isobutylene. The process of removing all of the un-reacted components from the rubber slurry requires significant amounts of energy. The greater molecular weight (and therefore higher boiling point) of the halogenated monomers also precludes the removal of these species following the halogenation process.

Solution processes for the polymerization of butyl rubber have been known for many years and are practiced commercially in Russia. An example of the solution process is described in CA 1,019,095, which discloses the use of isopentane as the preferred polymerization medium. The polymers produced using the above process are non-halogenated. Although halogenation could theoretically take place in isopentane, the presence of residual monomers (isobutylene and isoprene) would lead to formation of the afore-mentioned undesirable by-products during bromination. The removal of the un-reacted monomers is the challenge for such a process and has not been resolved yet. Although it would be desirable to remove the monomers by distillation, the boiling point of isopentane (28° C.) is lower than that of the heavier residual isoprene monomer (34° C.), therefore this kind of separation is impossible. Even if pure n-pentane (boiling point 36° C.) were used as the medium, the difference in boiling points would be insufficient to allow effective removal of the isoprene using distillation techniques. As a result, the residual monomers and medium would all have to be stripped together from the butyl rubber, as in the slurry process, with the rubber being subsequently re-dissolved for bromination. This is, in fact, more energy intensive than bromination from the conventional slurry process. The use of iso-pentane as a common medium for producing halobutyl rubber (XIIR) is therefore not practical using the conventional solution process.

It is known in the art to use hexane i.e. a C6 medium as a polymerization medium in the solution process. However, the viscosity of a polymer solution is strongly dependent upon the viscosity of the medium used. Because the viscosity of a C6 medium is much higher than that of a C5 medium, for a given molecular weight and polymer solids level, the resulting viscosity of the polymer solution is also much higher. This limits polymer solids content to relatively low levels when C6 is used as a solvent, since otherwise the solution becomes too viscous for good heat transfer, pumping and handling. The overall economics of a process depend strongly on the level of polymer solids in the solution or suspension emerging from the polymerization reactor; higher solids levels mean higher conversion and improved economics. In order to make material having a sufficiently high molecular weight for commercial purposes, it is necessary in butyl polymerization to employ relatively low temperatures, often less than –80° C. These low temperatures exacerbate the problem of high solution viscosity and lead to even lower solids levels. In the solution process, it is therefore quite difficult to achieve an economic solids level (conversion) at the desired temperature (molecular weight) when using hexane as a solvent due to high viscosity.

In U.S. Pat. No. 5,021,509 a process is disclosed whereby product from the conventional slurry polymerization process is mixed with hexane to produce a crude rubber solution or cement. The hexane is added to the methyl chloride-rubber slurry after exiting the polymerization reactor in order to dissolve the rubber in hexane while still finely divided and suspended in the methyl chloride/monomer mixture. A distillation process is then used to remove methyl chloride and residual isobutene and isoprene monomers for recycle, leaving just the rubber in a hexane solution ready for halogenation. This so-called "solvent replacement" process still requires that all of the original media left with the rubber after the polymerization stage are removed. The energy requirement is essentially the same as in the conventional process. No common solvent is employed for both polymerization and halogenation.

Consequently, there still remains a need for an efficient, environmentally favourable process for the preparation of halobutyl rubbers that significantly reduces energy and raw material consumption and operates within an acceptable range of viscosities in order to allow high rubber solids levels at the desired molecular weight. The process must further allow separation of the residual monomers from the solvent prior to halogenation in order to mitigate the formation of undesirable by-products.

SUMMARY OF THE INVENTION

There is now provided a process for the preparation of halogenated rubbers comprising at least the steps of:
a) providing a reaction medium comprising
   a common aliphatic medium comprising at least 50 wt.-% of one or more aliphatic hydrocarbons having a boiling point in the range of 45° C. to 80° C. at a pressure of 1013 hPa, whereby the common aliphatic medium further comprises a content of cyclic aliphatic hydrocarbons of less than 25 wt.-%, preferably less than 20 wt.-% and
   a monomer mixture comprising at least one isoolefin monomer, at least one multiolefin monomer and either no or at least one other co-polymerizable monomer
   in a mass ratio of monomer mixture to common aliphatic medium of from 40:60 to 99:1, preferably from 50:50 to 85:15 and even more preferably from 61:39 to 80:20;
b) polymerizing the monomer mixture within the reaction medium to form a rubber solution comprising a rubber polymer which is at least substantially dissolved in the medium comprising the common aliphatic medium and residual monomers of the monomer mixture;
c) separating residual monomers of the monomer mixture from the rubber solution to form a separated rubber solution comprising the rubber and the common aliphatic medium,
d) halogenating the rubber in the separated rubber solution using a halogenating agent which is in case of a brominating agent optionally at least partially regenerated by an oxidizing agent.

The scope of the invention encompasses any possible combination of definitions, parameters and illustrations listed herein whether in general or within areas of preference.

As used herein the term "at least substantially dissolved" means that at least 70 wt.-%, preferably at least 80 wt.-%, more preferably at least 90 wt.-% and even more preferably at least 95 wt.-% of the rubber polymer obtained according to step b) are dissolved in the medium.

In an embodiment of the invention the polymerization according to step b) and the provision of a solution according to step a) is effected using a solution polymerization reactor. Suitable reactors are those known to the skilled in the art and include commonly known flow-through polymerization reactors.

Step c) of the process may employ distillation to separate un-reacted residual monomers, i.e. the isoolefin monomers and the multiolefin monomers from the medium. This mitigates the formation of undesirable halogenation byproducts from the unreacted monomers. The process is conducted at a moderate or relatively high ratio of monomers to the common aliphatic medium. Typically, the isoolefin monomers have a significantly lower viscosity than the common aliphatic medium and therefore, a higher monomer level results in a lower overall viscosity. Overall energy efficiency and raw material utilization of the process is improved by eliminating the need to separate the rubber from a first diluent or solvent used for polymerization, then re-dissolve it in a second solvent for halogenation. The integrated process according to the invention therefore provides improved energy and raw material efficiency and a reduction in the number of process steps as compared with conventional non-integrated processes for making halogenated rubbers, in particular halobutyl rubbers.

In an embodiment of the invention the halogenation according to step d) is performed in a continuous process, for example using a commonly known flow-through halogenation reactor.

BRIEF DESCRIPTION OF THE DRAWING

Having summarized the invention, preferred embodiments thereof will now be exemplarily described with reference to FIG. 1 which shows a process flow diagram for a process according to the present invention that employs purification and optional recycle of un-reacted monomers following separation thereof from the polymer solution.

DETAILED DESCRIPTION

Referring to FIG. 1, a solution polymerization reactor 40 is provided with a feed of monomers M, comprising isoprene and isobutylene, and a feed of the common aliphatic medium S via an optional heat exchanger 10, preferably a recuperative heat exchanger, and feed cooler 20. The monomers may either be pre-mixed with the common aliphatic medium or mixed within the polymerization reactor 40. A catalyst solution, comprising a carbocationic initiator-activator system of the type used for butyl rubber polymerizations (e.g. a trivalent metal species, such as aluminium(organo)halides, and a small amount of water), is pre-mixed with the common aliphatic medium S in a catalyst preparation unit 30 and also introduced to the reactor 40. The solution polymerization is then allowed to occur within the polymerization reactor 40. Solution polymerization reactors 40 of a type suitable for use in the present integrated process, along with process control and operating parameters of such reactors, are described, for example, in EP 0 053 585 A, which is herein incorporated by reference. Conversion is allowed to proceed to the desired extent and then a reaction stopping agent Q, for example water or an alcohol such as methanol, is added and mixed into the reactor discharge stream comprising the common aliphatic medium S, un-reacted monomers M and butyl rubber IIR in mixer 50. The resulting polymer solution comprising un-reacted monomers M i.e. isoprene and isobutylene, the common aliphatic medium S and butyl rubber HR is passed through a recuperative heat exchanger 10 where it is warmed by the incoming feeds to the reactor, while at the same time helping to cool these feeds before they enter the final feeds cooler 20. The warmed polymer solution is then directed to a distillation column 60 for removal of the un-reacted monomers. Once the un-reacted monomers have been separated as recycling stream $M_R$, they exit from the top of the column 60 and the separated polymer solution (S, IIR) exits from the bottom of the column 60 to a solution bromination reactor 70. Additional common aliphatic medium S and/or water W may be provided to the halogenation reactor 70 in order to provide the desired conditions for halogenation. It is important to note that the same common aliphatic medium used for polymerization accompanies the butyl rubber through the process to halogenation and that there is no need to separate the polymer from the solvent prior to halogenation. A feed of a halogenation agent X is also provided to the halogenation reactor 70. The halobutyl rubber (XIIR) exits the reactor in solution (S, XIIR) and is then finished using finishing equipment 80, as is conventionally known. The common aliphatic medium removed during the finishing step is sent as recycling stream $S_R$ to solvent recovery 110 prior to introduction to solvent purification section 120. Additional common aliphatic medium $S_R$ may be added before purification 120 or afterwards, if the medium has already been pre-purified. The purified common aliphatic medium is recycled back to the recuperative heat exchanger 10 and final feed cooler 20 for re-use in the process. The un-reacted monomers separated from the polymer solution in the distillation column 60 are sent as recycle stream $M_R$ to monomer recovery unit 90 and are then purified in monomer purification section 100 prior to being recycled back to the recuperative heat exchanger 10 and feed cooler 20. Additional fresh monomers $M_F$ may be added either prior to monomer purification 100 or afterwards, if the monomers have been pre-purified. The use of a common aliphatic medium for both polymerization and halogenation reduces environmental impact and improves economic performance of the integrated process as compared with conventional approaches.

The description of the process given hereinabove is exemplary and can be applied to all common aliphatic media compositions as well as to all monomer and product compositions mentioned herein.

It is within the scope of the present invention that the composition of the common aliphatic medium may have a slightly varying composition before and after removal of the un-reacted monomers due to different boiling points of its components.

The monomer mixture used to produce the butyl rubber, by solution polymerization is not limited to a specific isoolefin or a specific multiolefin or to specific other co-polymerizable monomers, provided that the individual monomers have boiling points lower than the aliphatic hydrocarbons of the common aliphatic medium which are selected from those aliphatic hydrocarbons having a boiling point in the range of 45° C. to 80° C. at a pressure of 1013 hPa. It is clear that the boiling point of the monomers may be higher than 45° C. at a pressure of 1013 hPa, if the aliphatic hydrocarbons of the common aliphatic medium are selected in such a way that their boiling point is higher than that of the highest boiling component of the monomer mixture but still below 80° C. at a pressure of 1013 hPa.

Preferably, the individual monomers have boiling points lower than 45° C. at 1013 h Pa, preferably lower than 40° C. at 1013 hPa.

Preferred isoolefins are isobutene, 2-methyl-1-butene, 3-methyl-1-butene, 2-methyl-2-butene or mixtures thereof. The most preferred isoolefin is isobutene.

Preferred multiolefins are isoprene, butadiene or mixtures thereof. The most preferred multiolefin is isoprene.

In one embodiment, the monomer mixture may comprise in the range of from 80.0% to 99.9% by weight, preferably in the range of from 92.0% to 99.5% by weight of at least one, preferably one isoolefin monomer and in the range of from 0.1% to 20.0% by weight, preferably 0.5% to 8.0% by weight of at least one, preferably one multiolefin monomer. More preferably, the monomer mixture comprises in the range of from 95.0% to 98.5% by weight of at least one, preferably one isoolefin monomer and in the range of from 1.5% to 5.0% by weight of at least one, preferably one multiolefin monomer. Most preferably, the monomer mixture comprises in the range of from 97.0% to 98.5% by weight of at least one, preferably one isoolefin monomer and in the range of from 1.5% to 3.0% by weight of at least one, preferably one multiolefin monomer.

In a preferred embodiment of the invention the ranges given above apply to monomer mixtures wherein the isoolefin is isobutene and the multiolefin is isoprene.

In one embodiment, the multiolefin content of butyl rubbers produced according to the invention is for example in the range of 0.1 mol % to 20.0 mol %, preferably in the range of 0.5 mol % to 8.0 mol %, more preferably in the range of 1.0 mol % to 5.0 mol %, yet more preferably in the range of 1.5 mol % to 5 mol % and even more preferably in the range of 1.8 mol % to 2.2 mol %.

One of the ways in which the aforementioned viscosity problems have been overcome is by selecting a high ratio of monomers to solvent in the polymerization step. Although mass ratios of up to 60:40 monomers to aliphatic hydrocarbon solvent have been used in the prior art, in one aspect the present invention utilizes higher ratios, for example from 61:39 to 80:20, preferably from 65:35 to 70:30. The presence of higher monomer levels, which are predominantly C4 compounds and have lower viscosity than the common aliphatic medium, reduces the solution viscosity to tolerable limits and also permits a higher solids level to be achieved during polymerization. Use of higher monomer levels also allows an acceptable molecular weight to be reached at a higher temperature than when lower levels of monomer are employed. The use of higher temperature in turn reduces solution viscosity and permits greater polymer solids level in the solution.

Another one of the ways in which the aforementioned viscosity problems have been overcome is by selecting the common aliphatic medium as a solvent. A solvent having a higher content or consisting of compounds having a boiling point of less than 45° C. or less at 1013 hPa would have a boiling point such close to the monomers that their separation from the solution would also result in significant solvent removal.

The use of a solvent having a higher content or consisting of compounds having a boiling point of more than 80° C. at 1013 hPa would cause difficulties in the separation from the rubber after bromination. The solution viscosity provided by use of such solvents is also significantly higher than with the common aliphatic medium, making the solution more difficult to handle and impeding heat transfer in the reactor, even when provided with the high monomer to solvent ratios described above.

Furthermore, it was found that using common aliphatic medium with a content of cyclic aliphatic hydrocarbons, less than 25 wt.-%, preferably less than 20 wt.-% significantly reduces viscosity.

Cyclic aliphatic hydrocarbons include for example cyclopentane, methylcyclopentane and cyclohexane.

In another embodiment of the invention the common aliphatic medium has a content of cyclohexane (boiling point: 80.9° C. at 1013 hPa) of less than 5 wt.-%, preferably less than 2.5 wt.-%. Cyclohexane was found to increase viscosity if present in a higher amount.

In another embodiment of the invention the common aliphatic medium has a content of branched, non-cyclic aliphatic hydrocarbons having a boiling point in the range of 45° C. to 80° C. at a pressure of 1013 hPa of at least 30 wt.-% which was found to reduce viscosity further.

Branched, non-cyclic aliphatic hydrocarbons having a boiling point in the range of 45° C. to 80° C. at a pressure of 1013 hPa include 2,2-dimethylbutane, 2,3-dimethylbutane, 2-methylpentane, 3-methylpentane and 2,2-dimethylpentane.

In a preferred embodiment of the invention the common aliphatic medium comprises at least 80 wt.-% of one or more aliphatic hydrocarbons having a boiling point in the range of 45° C. to 80° C. at a pressure of 1013 hPa, preferably at least 90 wt.-%, even more preferably at least 95 wt.-% and yet even more preferably at least 97 wt.-%. Aliphatic hydrocarbons having a boiling point in the range of 45° C. to 80° C. at a pressure of 1013 hPa include cyclopentane, 2,2-dimethylbutane, 2,3-dimethylbutane, 2-methylpentane, 3-methylpentane, n-hexane, methylcyclopentane and 2,2-dimethylpentane.

The common aliphatic medium may, for example further comprise other compounds which are at least substantially inert under polymerization conditions such as other aliphatic hydrocarbons like for example heptanes and octanes having a boiling point of more than 80° C. at a pressure of 1013 hPa, propanes, butanes, pentanes, cyclohexane as well as halohydrocarbons such as methylchloride and other chlorinated aliphatic hydrocarbons which are at least substantially inert under reaction conditions as well as hydrofluorocarbons whereby hydrofluorocarbons are for example those represented by the formula: $C_xH_yF_z$ wherein x is an integer from 1 to 20, alternatively from 1 to preferably from 1 to 3, wherein y and z are integers and at least one.

In another preferred embodiment of the invention the common aliphatic medium is substantially free of halohydrocarbons.

As used hereinbefore the term "substantially free of halohydrocarbons" means a content of halohydrocarbons within the common aliphatic medium of less than 2 wt.-%, preferably less than 1 wt.-%, more preferably less than 0.1 wt.-% and even more preferably absence of halohydrocarbons.

The preferred ratio of monomers to a hydrocarbon solvent is not calculable in advance, but may be easily determined by very few routine experiments. Although increasing the amount of monomers should reduce solution viscosity, making accurate theoretical predictions of the extent of that reduction is not feasible due in part to the complex effect on viscosity of the interaction of various components of the solution at the concentrations and temperatures employed in the process.

In one embodiment, the process temperature of step b) is in the range of −100° C. to −40° C., preferably in the range of −95° C. to −65° C., more preferably in the range of −85° C. to −75° C., yet more preferably in the range of −80° C. to −75° C.

Although higher temperatures are desirable in that energy usage for refrigeration and pumping (due to lower viscosity at higher temperature) are reduced, this generally leads to lower molecular weight polymers that are not as commercially desirable. However, due to the use of high monomer to solvent ratios in the present invention, a reduced but still acceptable molecular weight can be obtained with higher temperatures.

Therefore, in an alternative embodiment, temperatures in the range of −50° C. to lower than −75° C., preferably −55° C. to −72° C., more preferably −59° C. to −70° C., yet more preferably −61° C. to −69° C., are used while still obtaining the desired molecular weight of butyl rubber.

The weight average molecular weight of butyl rubber polymers produced using the processes according to the invention, as measured prior to halogenation, typically is in the range of 200 to 1000 kg/mol, preferably 200 to 700 kg/mol, more preferably 325 to 650 kg/mol, even more preferably 350 to 600 kg/mol, yet more preferably 375 to 550 kg/mol, even more preferably 400 to 500 kg/mol. If not mentioned otherwise, molecular weights are obtained using gel permeation chromatography in tetrahydrofuran (THF) solution using polystyrene molecular weight standards.

The viscosity of the solution at the discharge of reactor 40 is typically and preferably less than 2000 cP, preferably less than 1500 cP, more preferably less than 1000 cP. A most preferred range of viscosity is from 500 to 1000 cP. If not mentioned otherwise, viscosities are measured in a rotational rheometer of cone-plate type (Haake). All given viscosities refer to the extrapolated zero shear viscosity.

The solids content of the solution obtained following polymerization is preferably in the range of from 3 to 25%, more preferably 10 to 20%, even more preferably from 12 to 18%, yet more preferably from 14 to 18%, even more preferably from 14.5 to 18%, still more preferably 15 to 18%, most preferably 16 to 18% by weight. As described previously, higher solids contents are preferred, but entail increased solution viscosity. The higher monomer to solvent ratios used in the present process allow higher solids contents to be achieved than in the past and advantageously also permit use of a common aliphatic medium for both polymerization and bromination.

As used herein the term "solids content" refers to weight percent of the polymer obtained according to step b) i.e. in polymerization and present in the rubber solution.

In step c), un-reacted residual monomers are removed from the solution following polymerization preferably using a distillation process. Distillation processes to separate liquids of different boiling points are well known in the art and are described in, for example, the *Encyclopedia of Chemical Technology*, Kirk Othmer, 4th Edition, pp. 8-311, which is incorporated herein by reference.

The degree of separation is largely dependent upon the number of trays used in the column. An acceptable and preferred level of residual monomers in the solution following separation is less than 20 parts per million by weight. About 40 trays have been found sufficient to achieve this degree of separation. Separation of the common aliphatic medium from the monomers is not as critical and contents of for example up to 10 wt.-% of components of the common aliphatic medium are acceptable in the overhead stream from the distillation process. In a preferred embodiment the contents of components of the common aliphatic medium in the overhead stream from the distillation process are less than 5 wt-%, more preferably less than 1 wt.-%.

With reference to FIG. 1, the process of the present invention preferably includes purification of the un-reacted monomers separated from the polymerization solution using the distillation column 60. A purification unit 100 may be provided for this purpose; alternatively, purification can take place offsite in a separate purification unit. The purified monomers are normally recycled back into the process and mixed with fresh monomers; however, they may alternatively be utilized in a different process or sold separately. Preferred embodiments of the process include these optional purification and recycling steps in order to achieve advantageous overall process economics.

Purification of monomers may be carried out by passing through adsorbent columns containing suitable molecular sieves or alumina based adsorbent materials. In order to minimize interference with the polymerization reaction, the total concentration of water and substances such as alcohols and other organic oxygenates that act as poisons to the reaction are preferably reduced to less than around 10 parts per million on a weight basis. The proportion of monomers that are available for recycle depends on the degree of conversion obtained during the polymerization process. For example, taking a ratio of monomer to common aliphatic medium of 66:34, if the solids level in the rubber solution produced is 10%, then 85% of the monomers are available to be returned in the recycle stream. If the solids level is increased to 18%, then 73% of the monomers are available for recycle.

Following removal of the un-reacted residual monomers, the rubber is halogenated In step d). The halobutyl rubber is produced using solution phase techniques. The separated rubber solution comprising the rubber and the common aliphatic medium, hereinafter also referred to as "cement" is treated with a halogenating agent, which is in case of using a brominating agent optionally at least partially regenerated by an oxidizing agent.

Supplemental solvent, for example comprising fresh common aliphatic medium, and/or water may be added to the separated rubber solution in order to form a cement having the desired properties for halogenation.

Halogenation in the common aliphatic medium used during the polymerization step advantageously saves energy as compared with the conventional slurry process by eliminating the need for separating the polymer from the polymerization medium, then re-dissolving it in a different medium for halogenation.

Preferably, the amount of halogenating agent is in the range of from 0.1 to 20%, preferably from 0.1 to 8%, more preferably from 0.5% to 4%, even more preferably from 0.8% to 3%, yet even more preferably from 1.2 to 2.5%, even still more preferably from about 1.5% to about 2.5% and most preferably from 1.5 to 2.5% by weight of the rubber.

In another embodiment the quantity of halogenating agent is 0.2 to 1.2 times the molar quantity of double bonds contained in the rubber, preferably the butyl rubber, preferably 0.3 to 0.8, more preferably 0.4 to 0.6 times the molar quantity.

Suitable halogenating agents include brominating and chlorinating agents.

Suitable brominating agents may comprise elemental bromine ($Br_2$), interhalogens such as bromine chloride (BrCl) and/or organo-halide precursors thereto, for example dibromo-dimethyl hydantoin, N-bromosuccinimide, or the like. The most preferred brominating agent is molecular bromine ($Br_2$).

Suitable chlorinating agents may comprise molecular chlorine ($Cl_3$). The most preferred chlorinating agent is molecular chlorine ($Br_2$).

If brominating agents are used in combination with oxidizing agents, suitable oxidizing agent were found to be water soluble materials which contain oxygen. Preferred oxidizing agents are peroxides and peroxide forming substances as exemplified by the following substances: hydrogen peroxide, sodium chlorate, sodium bromate, sodium hypochlorite or bromite, oxygen, oxides of nitrogen, ozone, urea peroxidate, acids such as pertitanic perzirconic, perchromic, permolybdic, pertungstic, perboric, perphosphoric, perpyrophosphoric, persulfates, perchloric, perchlorate and periodic acids.

Such oxidizing agents may either be used in combination with surfactants or not. In a preferred embodiment no surfactants are added.

Suitable surfactants are for example $C_6$-$C_{24}$-alkyl- or $C_6$-$C_{14}$-aryl-sulfonic acid salts, fatty alcohols and ethoxylated fatty alcohols and the like materials.

Preferred oxidizing agents are hydrogen peroxide and hydrogen peroxide-forming compounds, such as per-acids and sodium peroxide, whereby hydrogen peroxide is even more preferred.

For safety reasons, hydrogen peroxide is preferably applied in form of its aqueous solutions, in particular its aqueous solutions comprising 25 to 50 wt.-%, preferably 28 to 35 wt.-%, more preferably around 30 wt.-% of hydrogen peroxide.

The amount of oxidizing agent used in accordance with the invention depends on the amount and kind of brominating agent used. For example from 0.2 to about 5 mol of oxidizing agent per mol of brominating agent may be used, preferably from 0.5 to 3 mol and more preferably from 0.8 to 1.2 mol.

The oxidizing agent may be introduced into the reaction zone at the onset of the bromination reaction, it may be added prior to, concurrently with or subsequent to the addition of the brominating agent.

In a preferred embodiment the oxidizing agent is added prior to the brominating agent to allow its dispersal throughout the reaction medium the oxidizing agent is added concurrently or before the brominating agent.

In another embodiment the oxidizing agent is not added to the reaction mixture until after at least about 50% of the brominating agent has been consumed in the bromination reaction.

The halogenation process may be operated at a temperature of from 0° C. to 90° C., preferably from 20° C. to 80° C. and the reaction time may for example be from 1 minute to 1 hour, preferably from 1 to 30 minutes. The pressure in the bromination reactor may be from 0.8 to 10 bar.

The level of halogenation during this procedure may be controlled so that the final polymer has the preferred amounts of halogen described hereinabove. The specific mode of attaching the halogen to the polymer is not particularly restricted and those of skill in the art will recognize that modes other than those described above may be used while achieving the benefits of the invention. For additional details and alternative embodiments of solution phase bromination processes, see, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company 1987), particularly pp. 297-300, which are incorporated herein by reference.

After completion of the halogenation reaction, the rubber may be recovered by conventional methods, e.g., neutralization with dilute caustic, water washing and removal of solvent such as by steam stripping or precipitation using a lower alcohol such as isopropanol, followed by drying. Processing aids and antioxidants may be mixed with the halogenation rubber product prior to or subsequent to stripping the solvent.

The halogenated rubber may cured in a further step. The curing of halogenated rubbers is well known.

Suitable curing systems for use with the present product are those already known in the art for use with halogenated rubbers, in particular halobutyl rubbers and generally include conventional curing systems such as sulphur, resin and peroxide curing systems.

The halogenated rubbers and cured halogenated rubbers obtainable using the process according to the invention may be used as a part of a tire including, but not limited to an inner liner, tread, sidewall, an adhesive, as part of a thermoplastic elastomer, footwear, storage membranes, protective clothing, pharmaceutical stoppers, linings, and barrier coatings.

EXAMPLES

Example 1

Polymerization and Distillation

Key elements of the process described in FIG. 1 have been operated at pilot scale with reactors of 2 litre total capacity running in a continuous mode. Feeds to the reactors were 3.87 kg/h of isobutene, 0.09 kg/h of isoprene and 2.0 kg/h of a common aliphatic medium as described below giving a monomer/common aliphatic medium mass ratio of 66:34. The reaction temperature used was −65° C. and a solution having a solids content of 16 wt % was produced. This material had a weight average molecular weight of about 440 kg/mol and an isoprene content of about 1.7 mol-%. The solution from the reactors was fed to a distillation column with 40 trays and separation of the monomers from the rubber solution was performed. The solution was preheated to 42° C. and a re-boiler was used at the bottom of the column to maintain a bottom temperature of 113° C. A reflux condenser was used to return part of the overhead stream to the top of the column maintaining a temperature there of 36° C. The separation achieved in the column left less than 10 ppm of residual isoprene monomer in the separated rubber solution and about 1% of components of the common aliphatic medium in the overhead monomer stream. The separated monomers were purified, then re-introduced to the solution polymerization reactor. The separated rubber solution in the common aliphatic medium was such that bromination could be accomplished by conventional means with addition of supplemental common aliphatic medium.

The common aliphatic medium was consisting of:
less than 0.1 wt.-% butanes and pentanes having a boiling point below 45° C. at a pressure of 1013 hPa,
98.7 wt.-% pentanes and hexanes having a boiling point in the range of 45° C. to 80° C. at a pressure of 1013 hPa,
the residual amount to 100.0 wt.-% hexanes, heptanes and octanes having a boiling point above 80° C. at a pressure of 1013 hPa.

The total amount of cyclic aliphatic hydrocarbons present in the solvent was 18.7 wt. % (methylcyclopentane, cyclopentane and cyclohexane). The total amount of cyclohexane present in the solvent was 1.4 wt. %. The total amount of branched, non-cyclic aliphatic hydrocarbons present in the solvent was 34.4 wt. % (2,2-dimethylbutane, 2,3-dimethylbutane, 2-methylpentane, 3-methylpentane, 2,2-dimethylpentane).

The organometallic catalyst, ethylaluminumsesquichloride, was dissolved in the common aliphatic medium and activated by traces of water.

Example 2

Halogenation

The separated rubber solution was halogenated using a pilot scale bromination equipment. 10% supplemental common aliphatic medium was added to the separated rubber solution and the bromination effected by using elemental bromine. Thereby, a brominated butyl polymer containing 1.8% bromine was produced. The bromobutyl rubber solution was then finished using conventional drying and finishing techniques.

The foregoing describes only certain preferred embodiments and other features and aspects of the invention will be evident to persons skilled in the art. Variants or equivalents of described elements that function in the same way may be substituted without affecting the way in which the invention works.

The invention claimed is:

1. A process for the preparation of halogenated rubbers, the process comprising:
a) providing a reaction medium comprising
a common aliphatic medium comprising at least 50 wt.-% of one or more aliphatic hydrocarbons having a boiling point of 45° C. to 80° C. at a pressure of 1013 hPa, whereby the common aliphatic medium further comprises a content of cyclic aliphatic hydrocarbons of less than 25 wt.-% and
a monomer mixture comprising at least one isoolefin monomer, at least one multiolefin monomer and either no or at least one other co-polymerizable monomer
in a mass ratio of monomer mixture to common aliphatic medium of from 40:60 to 99:1,
b) polymerizing the monomer mixture within the reaction medium to form a rubber solution comprising a rubber polymer which is at least substantially dissolved in the medium comprising the common aliphatic medium and residual monomers of the monomer mixture;
c) separating residual monomers of the monomer mixture from the rubber solution to form a separated rubber solution comprising the rubber and the common aliphatic medium, and
d) halogenating the rubber in the separated rubber solution using a halogenating agent.

2. The process according to claim 1, wherein the rubber is a butyl rubber.

3. The process according to claim 1, wherein the monomer mixture comprises 80.0% to 99.9% by weight of the at least one isoolefin monomer and 0.1% to 20.0% by weight of the at least one multiolefin monomer.

4. The process according to one of the claims 1, wherein the isoolefin monomer is isobutene and the multiolefin monomer is isoprene.

5. The process according to one of the claims 1, wherein the common aliphatic medium comprises at least 80 wt.-% of one or more aliphatic hydrocarbons having a boiling point of 45° C. to 80° C. at a pressure of 1013 hPa.

6. The process according to one of the claims 1, wherein the common aliphatic medium has a content of cyclic aliphatic hydrocarbons of less than 20 wt.-%.

7. The process according to one of the claims 1, wherein the common aliphatic medium has a content of cyclohexane of less than 2.5 wt.-%.

8. The process according to one of the claims 1, wherein the common aliphatic medium contains at least 30 wt.-% branched, non-cyclic aliphatic hydrocarbons having a boiling point of 45° C. to 80° C. at a pressure of 1013 hPa.

9. The process according to one of the claims 1, wherein the reaction is performed in a polymerization reactor, and wherein the viscosity of the solution at the discharge of the polymerization reactor is less than 2000 cP.

10. The process according to one of the claims 1, wherein the solids content of the rubber solution obtained following step b) is 3 to 25% by weight.

11. The process according to one of the claims 1, wherein the halogenating agent is molecular bromine or chlorine.

12. The process according to one of the claims 1, wherein the amount of halogenating agent is 0.1 to 20% by weight of the rubber.

13. The process according to one of the claims 1, wherein the halogenating agent is a brominating agent and is used in combination with an oxidizing agent.

14. The process according to one of the claims 1, further comprises curing the halogenated rubber obtained in step d).

* * * * *